(12) United States Patent
Khojastepour et al.

(10) Patent No.: US 11,651,664 B2
(45) Date of Patent: May 16, 2023

(54) NEURAL NETWORK CLASSIFIER TRAINED FOR PURCHASING DIFFERENTIATION

(71) Applicant: NEC Laboratories America, Inc., Princeton, NJ (US)

(72) Inventors: Mohammad Khojastepour, Lawrenceville, NJ (US); Mustafa Arslan, Princeton, NJ (US); Sampath Rangarajan, Bridgewater, NJ (US); Eugene Chai, Monmouth Junction, NJ (US); Carlos Bocanegra, Boston, MA (US)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 17/171,143

(22) Filed: Feb. 9, 2021

(65) Prior Publication Data
US 2021/0248580 A1 Aug. 12, 2021

Related U.S. Application Data

(60) Provisional application No. 62/993,838, filed on Mar. 24, 2020, provisional application No. 62/972,265, filed on Feb. 10, 2020.

(51) Int. Cl.
*G07G 1/00* (2006.01)
*G06Q 20/20* (2012.01)
(Continued)

(52) U.S. Cl.
CPC .......... *G07G 1/009* (2013.01); *G06K 7/10297* (2013.01); *G06K 19/0723* (2013.01);
(Continued)

(58) Field of Classification Search
CPC ............... G07G 1/009; G06K 7/10297; G06K 19/0723; G06K 7/10009; G06K 7/10356;
(Continued)

(56) References Cited

U.S. PATENT DOCUMENTS

| 2013/0080279 A1 | 3/2013 | Daily et al. |
| 2016/0078264 A1* | 3/2016 | Armstrong ......... G08B 13/2462 340/572.1 |

(Continued)

FOREIGN PATENT DOCUMENTS

| WO | WO-2008118759 A2 * | 10/2008 | ............. G01S 19/49 |
| WO | WO-2016040593 A1 * | 3/2016 | ............ B65F 1/1426 |

OTHER PUBLICATIONS

Use of RFID to Calculate and Display Checkout Estimates for Retail Store Queues, 2006, The IP.com Prior Art Database (Year: 2006).*

(Continued)

*Primary Examiner* — Allen C Chein
*Assistant Examiner* — Aaron N Tutor
(74) *Attorney, Agent, or Firm* — Joseph Kolodka

(57) ABSTRACT

Systems and methods for self-checkout at a point-of-sale are provided. The system and method includes using a plurality of radio frequency identification (RFID) transceivers within a store, and an RFID reader configured to receive an RFID code from an RFID tag activated by the plurality of radio frequency identification (RFID) transceivers. The system and method also includes using a classifier configured to determine whether the RFID tag is inside or outside a designated area, wherein the classifier is trained in a manner that a number of items incorrectly identified as being purchased is below a threshold to minimize customer dissatisfaction (CDS) determined as the ratio of the value of items charged to the customer but not purchased by a customer to the total charge to the customer.

16 Claims, 7 Drawing Sheets

(51) Int. Cl.
- *G06K 7/10* (2006.01)
- *G06K 19/07* (2006.01)
- *G06N 3/04* (2023.01)
- *G06N 3/08* (2023.01)
- *G06Q 10/08* (2023.01)
- *G06Q 20/18* (2012.01)
- *G07C 9/00* (2020.01)
- *G06Q 10/087* (2023.01)

(52) U.S. Cl.
CPC ............... *G06N 3/04* (2013.01); *G06N 3/08* (2013.01); *G06Q 10/087* (2013.01); *G06Q 20/18* (2013.01); *G06Q 20/203* (2013.01); *G06Q 20/204* (2013.01); *G06Q 20/208* (2013.01); *G07C 9/00* (2013.01)

(58) Field of Classification Search
CPC ........ G06K 7/10425; G06N 3/04; G06N 3/08; G06N 3/0445; G06N 3/0481; G06Q 10/087; G06Q 20/18; G06Q 20/203; G06Q 20/204; G06Q 20/208; G07C 9/00
See application file for complete search history.

(56) References Cited

U.S. PATENT DOCUMENTS

| | | |
|---|---|---|
| 2018/0232796 A1 | 8/2018 | Glaser et al. |
| 2019/0371438 A1* | 12/2019 | Chintamaneni ........ G16H 40/20 |
| 2020/0057979 A1* | 2/2020 | Milum ............... G06K 19/0723 |
| 2020/0096599 A1* | 3/2020 | Hewett ............. G06K 7/10465 |

OTHER PUBLICATIONS

Yang et al., "Physical Layer Security in MIMO Backscatter Wireless Systems", arxiv:1608.07965v1 [cs.IT] Aug. 29, 2016, pp. 1-14.

* cited by examiner

NEURAL NETWORK CLASSIFIER TRAINED FOR PURCHASING DIFFERENTIATION

RELATED APPLICATION INFORMATION

This application claims priority to Provisional Application No. 62/972,265, filed on Feb. 10, 2020, incorporated herein by reference in its entirety, and Provisional Application No. 62/993,838, filed on Mar. 24, 2020, incorporated herein by reference in its entirety.

BACKGROUND

Technical Field

The present invention relates to a point-of-sale checkout system and more particularly a point-of-sale checkout system utilizing radio-frequency identification (RFID) and a neural network classifier.

Description of the Related Art

Customer self-checkout can involve manually aligning each product barcode with a scanner, which also involves sequential handling of each item, since barcodes require line-of-sight (LoS) and proper positioning relative to the scanner. This can result in delays and frustration due to repeatedly searching for the barcodes and repeated attempts to successfully scan the code. Such experiences can reduce the customer's overall shopping satisfaction. Using hand-held readers for self-checkout leaves the responsibility of correctly scanning the products completely and solely to the customer. Lengthy checkout processes, including both the wait time in the queue as well as the manual process of scanning items in succession can reduce customer satisfaction.

SUMMARY

According to an aspect of the present invention, a system is provided for self-checkout at a point-of-sale. The system includes a plurality of radio frequency identification (RFID) transceivers within a store, and an RFID reader configured to receive an RFID code from an RFID tag activated by the plurality of radio frequency identification (RFID) transceivers. The system also includes a classifier configured to determine whether the RFID tag is inside or outside a designated area, wherein the classifier is trained in a manner that a number of items incorrectly identified as being purchased is below a threshold to minimize customer dissatisfaction (CDS) determined as the ratio of the value of items charged to the customer but not purchased by a customer to the total charge to the customer.

According to another aspect of the present invention, a system is provided for self-checkout at a point-of-sale. The system includes a pair of RF-absorbing walls separated by a distance, and a plurality of radio frequency identification (RFID) elevated transceivers within each of the pair of RF-absorbing walls. The system further includes a plurality of floor-mounted transceivers in a floor below the pair of RF-absorbing walls, wherein the signal coverage of the plurality of radio frequency identification (RFID) transceivers determines a checkout area (CA), and an RFID reader, wherein the RFID reader is configured to receive an RFID code from each of a plurality of RFID tags activated simultaneously by the plurality of radio frequency identification (RFID) transceivers, the RFID reader configured to receive each of the plurality of RFID codes in a separate time slot of a block of a transmit frame. The system further includes a classifier configured to determine whether the RFID tag is inside or outside a designated area, wherein the classifier is trained in a manner that a number of items incorrectly identified as being purchased is below a threshold to minimize customer dissatisfaction (CDS) determined as the ratio of the value of items charged to the customer but not purchased by a customer to the total charge to the customer.

According to yet another aspect of the present invention, a method is provided for self-checkout at a point-of-sale. The method includes detecting that a person has entered a checkout area, and determining whether an RFID tag is inside the checkout area (CA) using a neural network classifier and a plurality of radio frequency identification (RFID) transceivers. The method also includes charging the person an amount for items associated with the RFID tag determined to be inside the checkout area.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
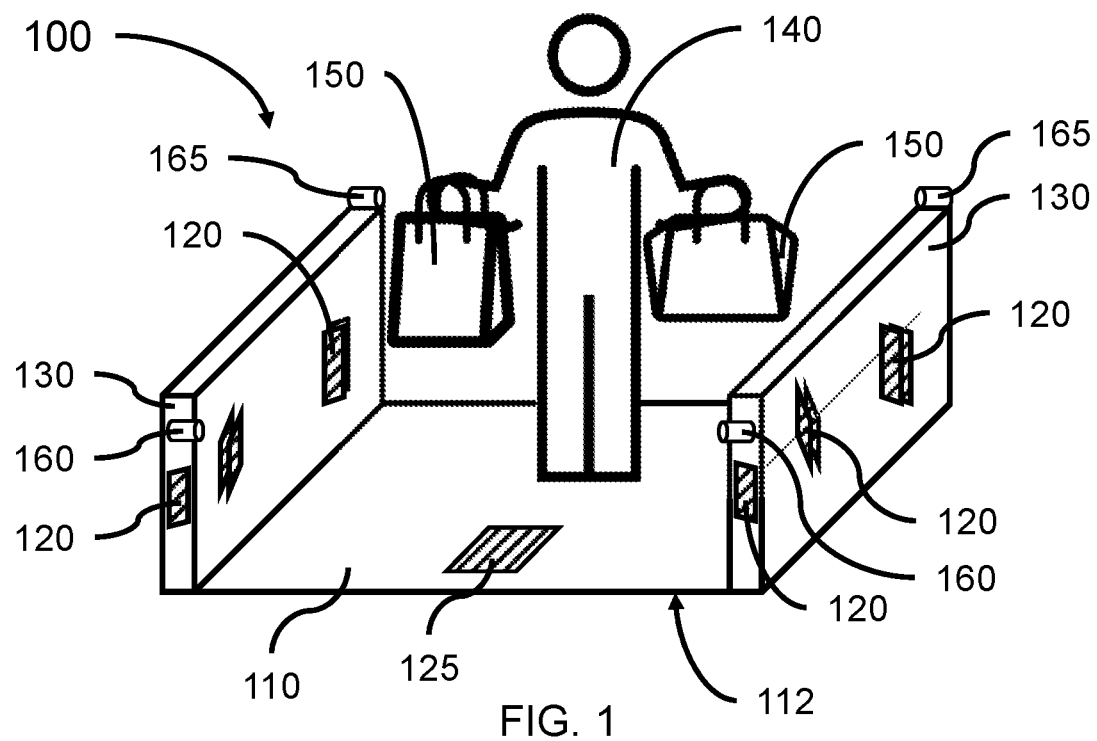
FIG. 1 is a diagram illustrating a high-level system/method for a point-of-sale checkout system utilizing radio-frequency identification (RFID), in accordance with an embodiment of the present invention.

In accordance with embodiments of the present invention, systems and methods are provided to/for a seamless self-checkout at a point-of-sale using radio-frequency identification (RFID).

In one or more embodiments, a system and method identifies products using passive RFID tags. The system can scan the RFID tags associated with the products in a dedicated check-out area that is large enough to allow the customers to simply walk in and stand in the area until the scan is complete.

In one or more embodiments, the RFID-based seamless self-checkout solution does not require continuous tracking of customers with privacy intrusive cameras.

In various embodiments, the system can include a custom-built RFID reader that simultaneously decodes a tag's response from multiple carrier-level synchronized antennas, enabling capture of a large set of tag observations in a very short time, where carrier level refers to the carrier frequency(ies). The synchronization can be very accurate and is up to the phase of the carrier frequency of the signal. The observations can be fed to a neural network model that can accurately distinguish the products within the checkout area and in possession of the customer from those items and RFID tags that are outside the checkout area.

Various embodiments can use passive (i.e., battery-less) RFID tags as opposed to identifying products with cameras. RFID is prevalent in retail industry, especially for inventory tracking at major apparel brands. Instead of continuously tracking customer activity throughout the store, the system can identify purchases in a dedicated area (e.g., right before the store exit) referred to as a checkout area (CA) that is equipped with RFID antennas. The customers can simply walk into and stand in the CA, while carrying or carting the products they wish to purchase. In such a manner, the system should not require any extensive human involvement to calculate the cost of the purchased items.

In accordance with additional embodiments of the present invention, systems and methods are also provided to minimize vendor loss and maximize the customer satisfaction by modeling the checkout system as a binary classifier with a ground set of objects. The ground set of objects can be partitioned into a two sets representing purchased items (e.g., the contents of the customer's cart) versus unpurchased items (e.g., the objects not in the customer's cart).

In various embodiments, a classifier algorithm partitions a set of objects into positive and negative subsets, where the set of objects can include all objects detected by a seamless self-checkout system at a point-of-sale using radio-frequency identification (RFID). These detected objects may include items in the possession of a person checking out, as well as items in the possession of other people waiting to check out and items still about the store, but not in anyone's possession (e.g., items still on shelves, returns, items left in unattended carts, etc.).

In accordance with embodiments of the present invention, systems and methods are provided to measure vendor loss and customer satisfaction as a performance metric. For example, when the positive and negative sets of the classification problems are random variables, these metrics are defined for a particular realization of the problem. In various embodiments, the metrics are defined for a given classification problem, while not for a particular classifier, since different classifiers could be applied to the classification problem. The metric(s) is/are defined for a set of item(s).

The metrics are defined for this classification problem and can be computed for any classifiers and hence the value of the metric can be used to evaluate any particular classifier.

In various embodiments, the defined metrics can be used in evaluating the performance of a classifier, and also used directly in the design of the automatic/self-checkout system.

In various embodiments, an objective function can be defined based on the metrics associated with vendor loss and customer satisfaction, and for example may be used in training a model, for example, for a multi-layer neural network (e.g., deep neural network, recurrent neural network, etc.).

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

Each computer program may be tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

It is to be understood that aspects of the present invention will be described in terms of a given illustrative architecture; however, other architectures, structures, substrate materials and process features and steps can be varied within the scope of aspects of the present invention.

Referring now in detail to the figures in which like numerals represent the same or similar elements and initially to FIG. 1, a high-level system/method for a point-of-sale checkout system utilizing radio-frequency identification (RFID) is illustratively depicted in accordance with an embodiment of the present invention.

In one or more embodiments, a checkout area (CA) 110 of a checkout system 100 can be defined by a one or more antennas placed in different positions and with different orientations to reliably read radio-frequency identification (RFID) chips (also referred to as "tags") regardless of the chip's orientation, and configured to activate and read RFID chip associated with each item in a store. The customers can simply walk into and stand in the CA 110 while carrying the products they wish to purchase. The antennas can be elevated transceivers 120 or floor-mounted transceivers 125 that can both energize a passive RFID chip and read a transmitted signal, where the RF tags can be read without line-of-sight (LoS) to the tag(s). In various embodiments, the elevated transceivers 120 can be a distance above the floor of the store and situated at one or more heights aligned with the heights of items placed in carrying bags, shopping carts, a customer's hands or arms, or other conveyances used to carry store items while shopping. A plurality of elevated transceivers 120 can be placed at several different heights to improve the reading of any particular RFID chip, regardless of height or orientation of the one or more RFID chip(s) to improve performance of the checkout system 100. Different numbers and arrangements of the elevated transceivers 120 and floor-mounted transceivers 125 can be used. For example, two (2) or four (4) elevated transceivers 120 can be on the sides and two (2) floor-mounted transceivers 125 on the ground inside a waiting area, although other quantities are contemplated.

In various embodiments, the antennas can be positioned in three main orientations defined by three planes that are mutually orthogonal. In addition, the antennas can be placed in various positions and sufficiently apart from each other to form uncorrelated communication channels. If a tag is in a deep fading spot or blind spot with respect to one antenna, it may not be for another antenna at a different lateral location, height, and/or orientation. Deep fading happens when multiple copies of a signal destructively combine at a particular location. By utilizing antenna diversity for transmit (TX) and receive (RX) paths, the checkout system 100 can reduce the occurrence of blind spots. Using different orientations of the antennas also allows for reading tags in the same physical volume but with different orientations.

In various embodiments, elevated transceivers 120 can be angled/oriented to scan a region outside of a designated checkout area (CA) 110, including a waiting area (WA).

In various embodiments, one or more transceivers can be floor-mounted transceivers 125, where floor-mounted transceivers can be positioned in different quadrants of the checkout area 110.

In various embodiments, each of the transceivers 120, 125 can include a transmitter that sends a signal that can energize and activate an RFID chip, and a receiver that can receive a signal transmitted by the activated RFID chip. The signal transmitted from the activated RFID chip can include a code that is unique to each item present in the store (each tag responds with its unique ID), so both the checkout system and an inventory system can identify the specific product being purchased, and deduct the item from a list of items available for purchase.

In various embodiments, dual area antenna can be located in different places and with different orientations, such that the antennas can be grouped into two sets, a first set primarily reading the RFID tags that are outside the checkout area and a second set for primarily reading the RFID tags that are placed inside the checkout area. A dual-area antenna deployment can be used to cover areas within and outside the CA 110, where two distinct sets of antennas can be placed in such a way that the "inside" antennas primarily illuminate and read the tags "inside" the CA, and "outside" antennas primarily illuminate and read the tags "outside" the CA. Using different orientation of the antennas can thereby cover different physical areas and read tags with different orientations that are in the same physical volume but in different orientations. It should be noted that the antenna of the transceivers 120, 125 may transmit a weak signal in some unintended directions, so RFID tags outside the checkout area 110 may be activated and read by the system 100.

In various embodiments, RF-absorbing walls 130 can be positioned on opposite sides of a checkout area 110, where the walls can be positioned to accommodate one or more people, including a shopper with purchased items. The RF-absorbing walls 130 can assist in blocking radio frequency (RF) signals transmitted in unintended directions (e.g., outside the CA), where the RF-absorbing walls 130 can be lined with RF absorbers/absorbing material(s) to minimize RF signal spillover from the antennas mounted inside the CA. The physical structure can also clearly demarcate the checkout area 110, and contain multiple RFID antennas carefully placed to mitigate blind spots. The RF-absorbing walls 130 can be shorter than an average person to provide sufficient vertical height for the elevated transceivers 120 without creating a claustrophobic environment.

In various embodiments, the RF-absorbing walls 130 can have a height in a range of about 2 feet (ft) to about 4 ft, or about 2½ ft to about 3½ ft, or about 3 ft, although other heights are also contemplated. The RF-absorbing walls 130 can have a thickness sufficient to house elevated transceivers 120, where the transceivers can be oriented at different angles to cover the checkout area 110 and/or waiting area, as well as tags in the checkout area 110 and/or waiting area with different heights and/or orientations.

In various embodiments, multiple transceivers 120 can be placed in different lateral positions, heights, and with different orientations/facings within each of two RF-absorbing walls 130 to reliably read tags regardless of the tag's position and orientation. The checkout area 110 can be situated between the two RF-absorbing walls 130. The checkout system 100 can scan RFID tagged products without requiring the customer to take them out of bags 150 or carts (if in a cart or a bag) and align them with a specific antenna.

In a nonlimiting exemplary embodiment, six transceivers can be deployed as follows: (1) two elevated transceivers 120 in each side wall facing the inside area, which are placed almost at 45° angle to the face of the absorbing wall(s) 130 and (2) two floor-mounted transceivers 125 under the floor mat placed parallel to the floor facing upward. Four antennas can also be deployed to read the tags in the waiting area (WA): (1) one antenna can be mounted within each absorbing wall 130 at about a 20° angle facing the WA, and (2) two floor-mounted transceivers 125 under the floor mat at a distance of about 2 ft from the entrance of RFGo.

In various embodiments, one or more persons 140 can enter the checkout area 110, where one or more of the persons can have one or more items to be purchased. The one or more items can be held in bags 150, shopping carts, or in hand, for purchasing. The checkout system 100 can detect each item within the checkout area 110, and determine a total cost for the items identified within the checkout area without line-of-sight (LoS) to the tag(s). In some instances, items outside the checkout area 110 may be identified by the checkout system as within the checkout area and being purchased.

In various embodiments, the RF-absorbing walls 130 may not block the entrance and exit of the checkout area 110, so energizing signals from the transceivers 120, 125 may extend beyond the entry boundary 112 and exit boundary of the checkout area 110 to RFID tags outside the checkout area. The RF-absorbing walls 130 may not extend to the ceiling of a store, so energizing signals from the transceivers 120, 125 may extend passed the RF-absorbing walls 130 to RFID tags outside the checkout area. Similarly, ID signals transmitted by the RFID tags outside the checkout area 110 may be detected and read by transceivers 120, 125 within the checkout area 110, and register the received signal as item(s) being purchased by a customer. The RF tags can thereby be read without LoS to the tag(s).

In various embodiments, sensors may be situated to detect persons entering and/or leaving the checkout area 110, where there can be entry sensor(s) 160 to detect when a person has entered the checkout area, and an exit sensor 165 to determine when a person has exited the checkout area 110.

In various embodiments, the sensors 160, 165 can be photo-electric sensors, ultrasonic sensors, microwave/radar sensors, video cameras/sensors, infrared sensors, and combinations thereof.

Figure 2:
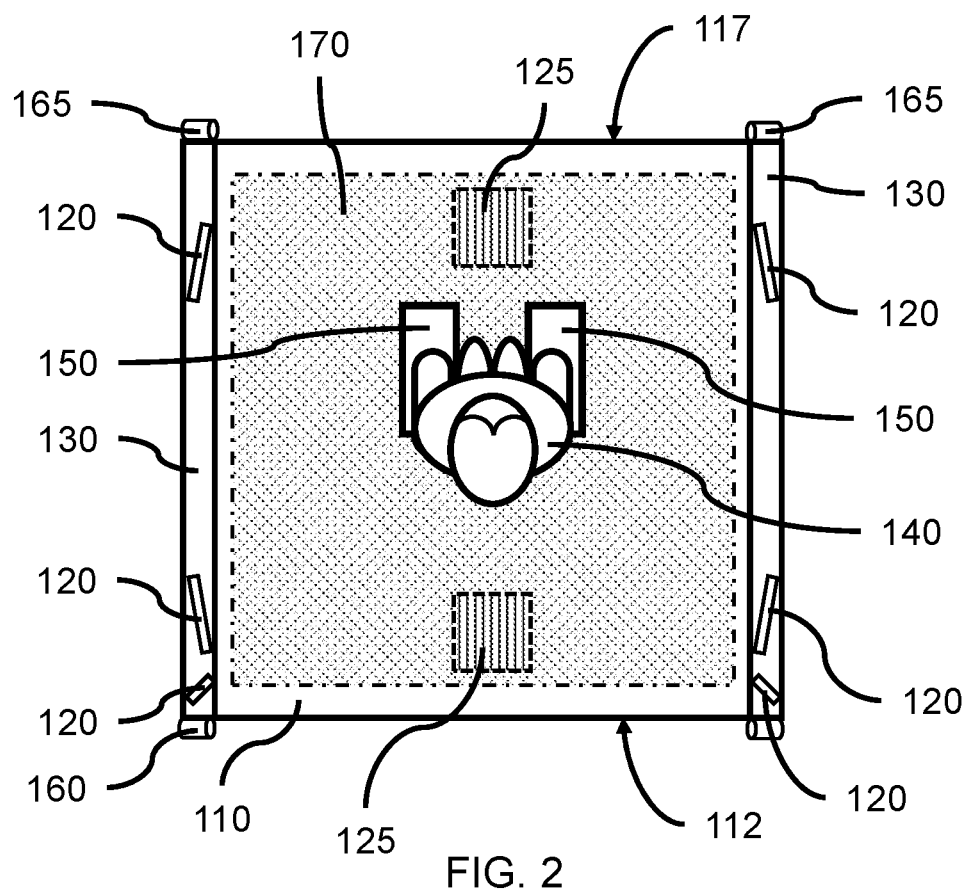
FIG. 2 is a top view illustrating a system/method for a point-of-sale checkout system utilizing radio-frequency identification (RFID), in accordance with an embodiment of the present invention.

FIG. 2 is a top view illustrating a system/method for a point-of-sale checkout system utilizing radio-frequency identification (RFID), in accordance with an embodiment of the present invention.

In various embodiments, one or more sensor(s) can be situated in the floor below the checkout area, where a floor sensor 170 can be configured to detect the presence of a person within the checkout area 110. The floor sensor(s) 170 can extend over the entire checkout area 110, a portion of the checkout area, or be in several different regions of the checkout area to detect one or more persons in the checkout area. In various embodiments, the floor sensor 170 can be a pressure sensor.

In various embodiments, a determination that a person 140 has entered and not left the checkout area 110 can trigger a checkout processes, including energizing and reading one or more RFID tag(s) identified as within the checkout area. The elevated transceivers 120 and/or floor-mounted transceivers 125 can send out an energizing signal to energize RFID tags within range of the transceivers 120, 125 to energize and prompt the RFID tag(s) to send an ID code back to the antenna of the transceivers. The checkout system 100 can scan RFID tagged products without requiring the customer to take them out of bags 150 or carts and determine a total cost without passing them in front of a scanner. The floor-mounted transceivers 125 can be used to identify an entry boundary 112 and an exit boundary 117 of the checkout area 110.

Figure 3:
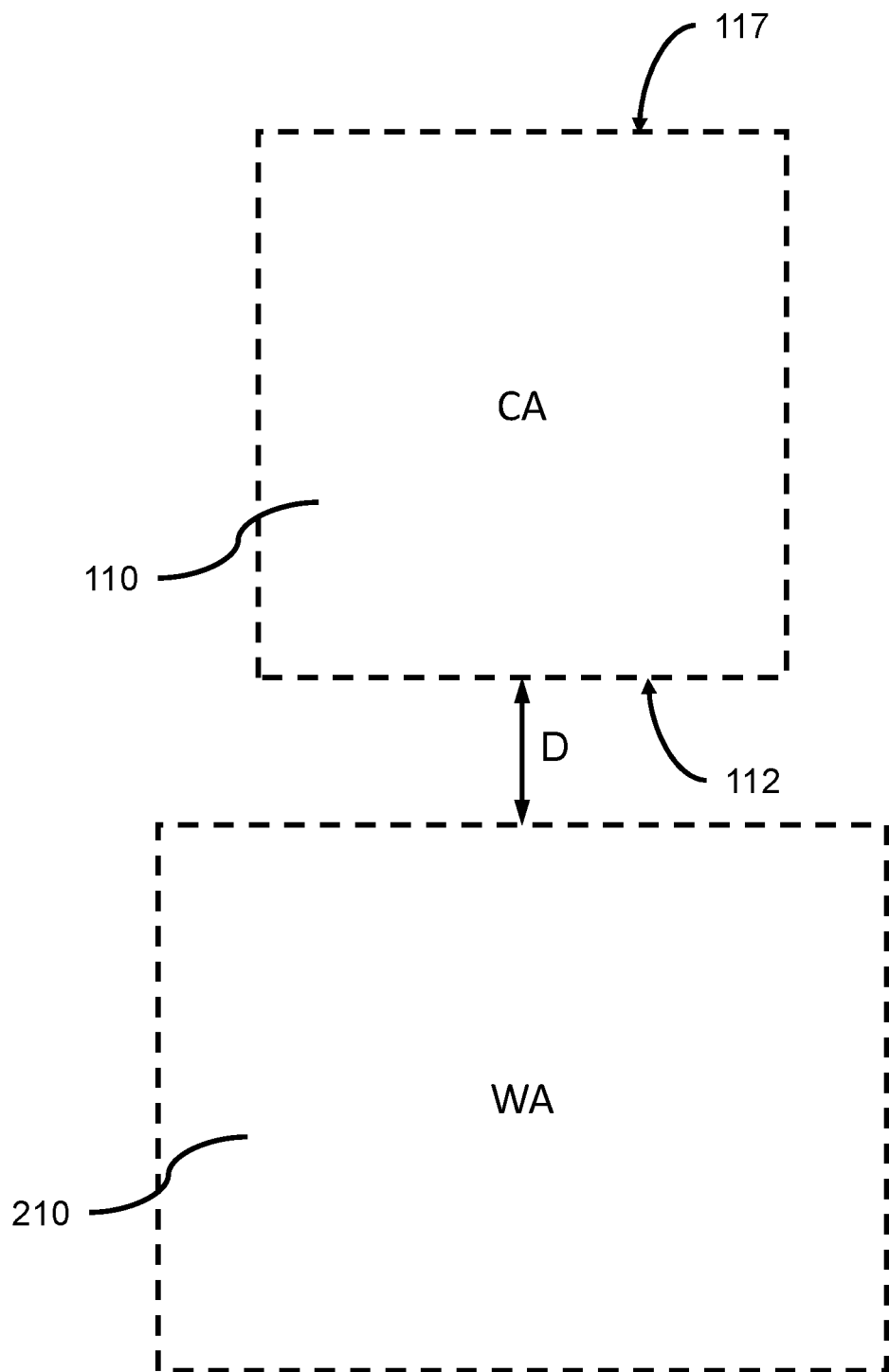
FIG. 3 is a top view block diagram illustrating a checkout area and a waiting area for a point-of-sale checkout system utilizing radio-frequency identification (RFID), in accordance with an embodiment of the present invention.

FIG. 3 is a top view block diagram illustrating a checkout area and a waiting area for a point-of-sale checkout system utilizing radio-frequency identification (RFID), in accordance with an embodiment of the present invention.

In various embodiments, each customer brings the products (e.g., in a bag, shopping cart, or by holding in hand) and stands briefly inside the checkout area (CA) 110, while other customers line up in the waiting area (WA) 210. The signals from the transceivers 120, 125 can extend beyond the checkout area 110, including outside an entry boundary 112 and an exit boundary of the checkout area 110. The waiting area 210 can be offset a distance, D, from the checkout area 110, where the distance, D, can be sufficient to reduce activation of RFID tags outside the checkout area 110, where passive (i.e., battery-less) RFID tags are used. The waiting area 210 can provide room for customers to wait and maneuver into the checkout area.

In various embodiments, the waiting area can be a distance, D, of about 1 ft to about 5 ft, or about 2 ft to about 4 ft, or about 1 ft to about 2 ft, although other distances are also contemplated.

The checkout system 100 can identify purchases in a dedicated area right before a store exit with RFID antennas. In various embodiments, the checkout system 100 can completely and solely identify the products present in the CA, meaning no product is missed from the current customer's basket or extra products are identified (e.g., from other people's basket in the WA).

In various embodiments, the performance of the checkout system 100 can be based on Recall and Precision, where Recall is the ratio of correctly identified products to all products in the customer's basket (ideal is 100%), and Precision is the ratio of correctly identified products to all products identified by the checkout system 100 (again ideal is 100%), which may include those inside the CA (correct detection) as well as outside the CA (incorrect detection).

In various embodiments, a dual-area antenna deployment can be used to cover the area both within the CA 110 and the WA 210 to increase the checkout accuracy. A software classifier can then determine whether a tag 410 is inside or outside the CA 110 based on the observations gathered by the checkout system 100 (without explicit tag localization).

In various embodiments, the checkout area (CA) 110 can have dimensions of about 2 ft by about 2 ft to about 10 ft by about 10 ft, or about 3 ft by about 4 ft to about 5 ft by about 8 ft, although other sized areas are also contemplated.

In various embodiments, the waiting area (WA) 210 can have dimensions of about 3 ft by about 10 ft to about 20 ft by about 20 ft, or about 5 ft by about 8 ft to about 15 ft by about 15 ft, although other sized areas are also contemplated.

The CA 110 and WA 210 can each be large enough to comfortably accommodate a customer with products to be purchased at checkout, along with bags, carts, children, etc. The CA can allow some freedom of movement to the customer without forcing them to stand still or in a particular position/orientation during the checkout process.

In a non-limiting exemplary embodiment, the CA 110 can be unbarricaded e.g., not enclosed by sliding doors or other large physical obstacles, where this can be desirable both for aesthetics, where the CA does not abruptly stand out as a major structure in an open-floor store design, and for human psychology where customers do not feel trapped from all sides. The CA 110 can form a "lane" demarcated by two waist-level side walls without entry or exit barriers. A waiting area (WA) 210 can be adjacent to the CA 110.

Figure 4:
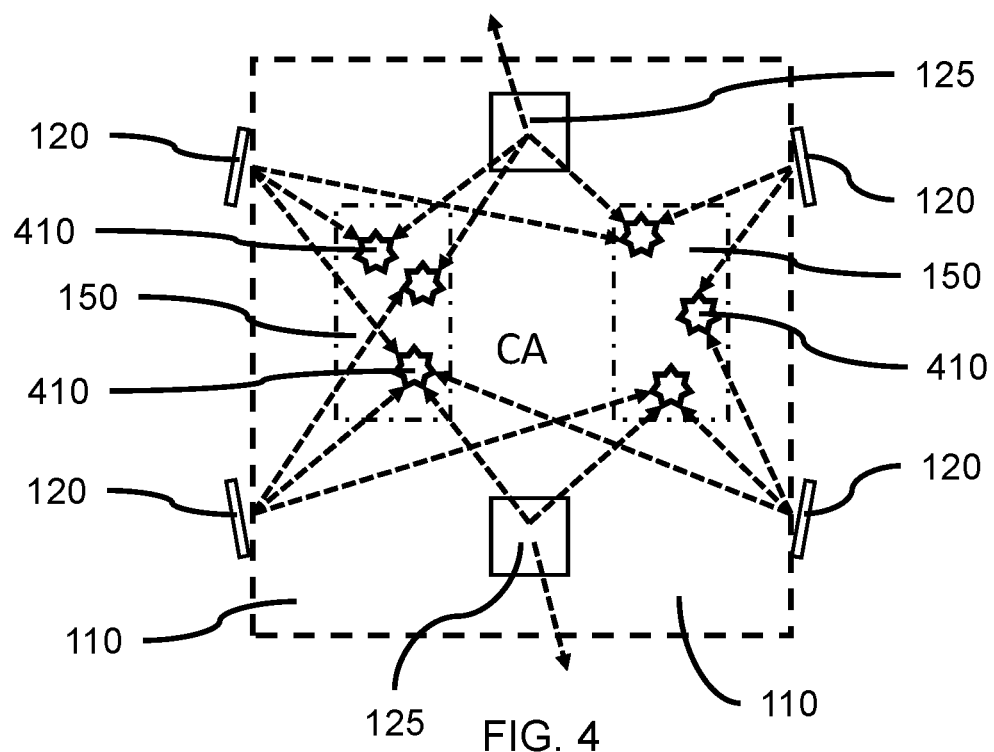
FIG. 4 is a diagram illustrating a checkout process for a point-of-sale checkout system utilizing radio-frequency identification (RFID), in accordance with an embodiment of the present invention.

FIG. 4 is a diagram illustrating a checkout process for a point-of-sale checkout system utilizing radio-frequency identification (RFID), in accordance with an embodiment of the present invention.

In various embodiments, an RFID chip 410 can be associated with a particular item by being attached to or embedded in the packaging of each item. Each item in a store can have an associated RFID chip with a unique ID value that can identify the type, brand, size, etc. of product being purchased, and corresponding to the price of the item. In various embodiments, the unique ID value can specifically identify a single item from multiple items of the same type, brand, size, etc. The RFID tags 410 can be passive, where the chip does not include a battery, but instead uses an antenna that can be energized by a radio signal. In various embodiments, an RFID chip 410 can be active (include a power source (e.g., battery).

When a customer takes an item and places it in a bag, cart, or simply holds it, the RFID tag accompanies the item around the store, and may eventually reach the checkout area 110. When the customer enters the checkout area 110, one or more sensors 160, 170 may determine the customer is inside the checkout area and wishes to pay for the items present. The checkout system may then activate the antennas and send an energizing signal to the passive RFID tags 410.

In various embodiments, the checkout system 100 can include a reader that energizes the RFID tags 410 and sends commands to them. After harvesting enough energy from the reader, tags wake up to listen for the reader commands and react to them, for example, by sending a particular response to the reader. Signals from various transceivers can reach multiple tags 410, where the tags are not in a blind spot. The received radio frequency signals can activate the tags 410 causing each RFID tag to broadcast a checkout code back to the antennas of one or more transceivers 120, 125.

Figure 5:
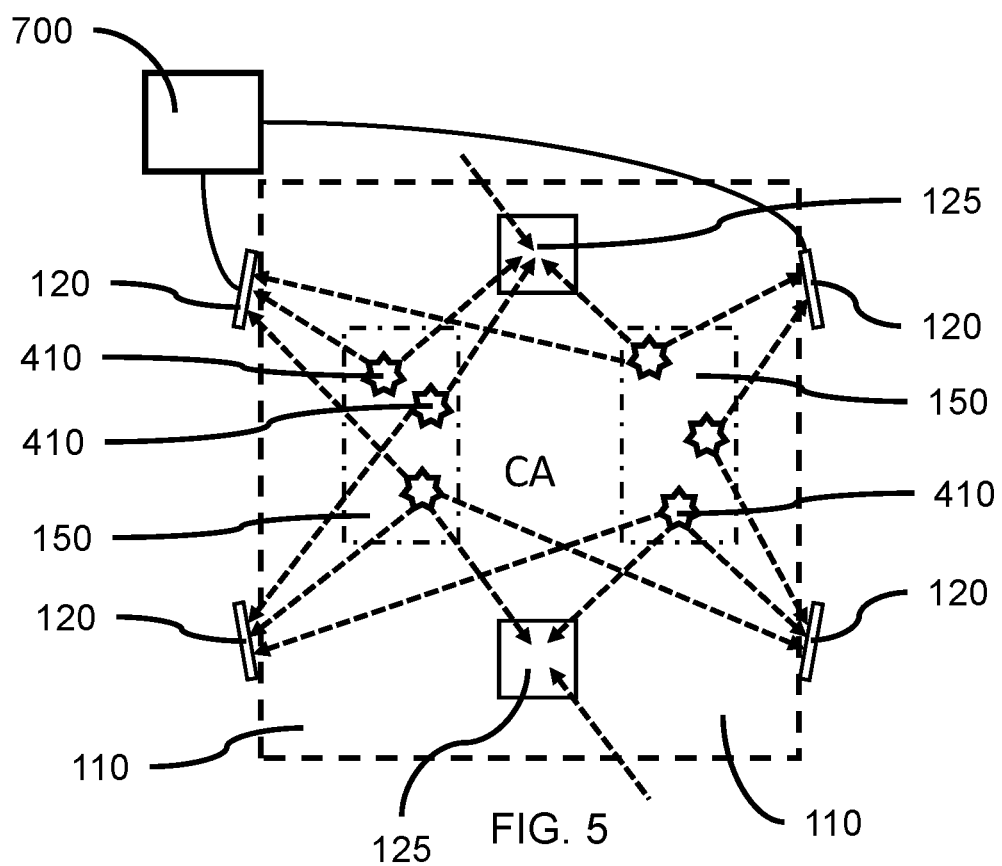
FIG. 5 is another diagram illustrating a checkout process for a point-of-sale checkout system utilizing radio-frequency identification (RFID), in accordance with an embodiment of the present invention.

FIG. 5 is another diagram illustrating a checkout process for a point-of-sale checkout system utilizing radio-frequency identification (RFID), in accordance with an embodiment of the present invention.

In various embodiments, multiple antennas (elevated transceivers 120 and/or floor-mounted transceivers 125) can be used, so no product is missed from a customer's basket within the checkout area 110, nor extra products from outside the checkout area being identified as purchased by the customer. Multiple observations from a single RFID tag's reply can be obtained by simultaneously decoding the reply from multiple antennas (elevated transceivers 120 and/or floor-mounted transceivers 125) that are synchronized at the carrier-level. Enough readings from multiple antennas placed in different positions can be utilized to accurately make a determination. Multiple antennas with sufficient power may read the tags within the CA 110, but there may be signal spillover to areas outside the CA resulting in unwanted reads. This problem may be exacerbated for an unbarricaded CA. The checkout system may then activate the antennas and read a checkout code transmitted by the RFID tag.

A neural network-based classifier can extract features from the observations and combines them appropriately using supervised learning can be used to identify items being purchased within the CA 110.

In various embodiments, the fast identification process can take only a few seconds that is the typical time for credit card and phone-based (QR code, NFC) payment authentication, or facial-recognition based payments, etc. In various embodiments, a checkout process that reads the RFID tags on the items being purchased can take a time period of about ½ seconds (sec) to about 60 sec, or about 5 seconds (sec) to about 60 sec, or about 10 sec to about 30 sec, or about ½ sec to about 5 sec, or about ½ sec to about 2 sec, although other time periods are also contemplated.

A stationary tag in a particular position and orientation is in a blind spot when it is not readable at all. Blind spots occur either due to weak illumination, where the tag is not activated by the reader and so it does not even reply to it; or to weak response, where tags respond but the replies are not decodable at the reader. For a passive RFID tag, being illuminated means that the tag can harvest enough energy to wake up and respond to reader commands. The received signal energy at a tag is a function of the transmit power of the reader, the distance between the tag and the reader, the direction of the tag relative to the reader antenna, the reader antenna pattern and environmental factors such as temperature. RFID tags are best read when they are oriented in a way that maximizes the received power induced at the tag's antenna. For a flat tag, this can happen when the received signal from the reader is orthogonal to the plane of the tag's antenna.

Any deviation from this ideal orientation may significantly reduce the signal strength of the tag's response In addition to waking up, a tag needs to receive reader commands with enough signal-to-noise ratio (SNR) to decode and respond to them.

The signals backscattered by other tags in the vicinity can also impact a particular tag's readability. For example, a tag that can be detected when it is the only tag in the reader's view may not be readable when other tags are brought in close proximity.

A tag may not be illuminated by the reader when it is situated in a spot with deep fading due to destructive interference. Deep fading happens when multiple reflected copies of a signal destructively combine at a particular location. Similarly, the same destructive interference may also happen at the reader antenna for the reflected copies of a tag's response affecting its reception and/or decodability by the RFID reader 700.

In various embodiments, the checkout system includes a custom-built RFID reader 700, that is in communication with the transceivers 120, 125, and extracts multiple observations from a single tag's reply by simultaneously decoding the reply from multiple antennas that are synchronized at the carrier-level (carrier frequency).

In contrast, traditional RFID readers may decode tag replies using one antenna at a time, which can require significantly longer time to capture the same number of observations due to sequential energizing and reading of RFID tags. Reading a tag may not only obtains its Electronic Product Code (EPC) (defined in the EPCglobal Tag Data Standard), but also reveals important features that may be extracted from its physical signal (e.g., signal strength).

Figure 6:
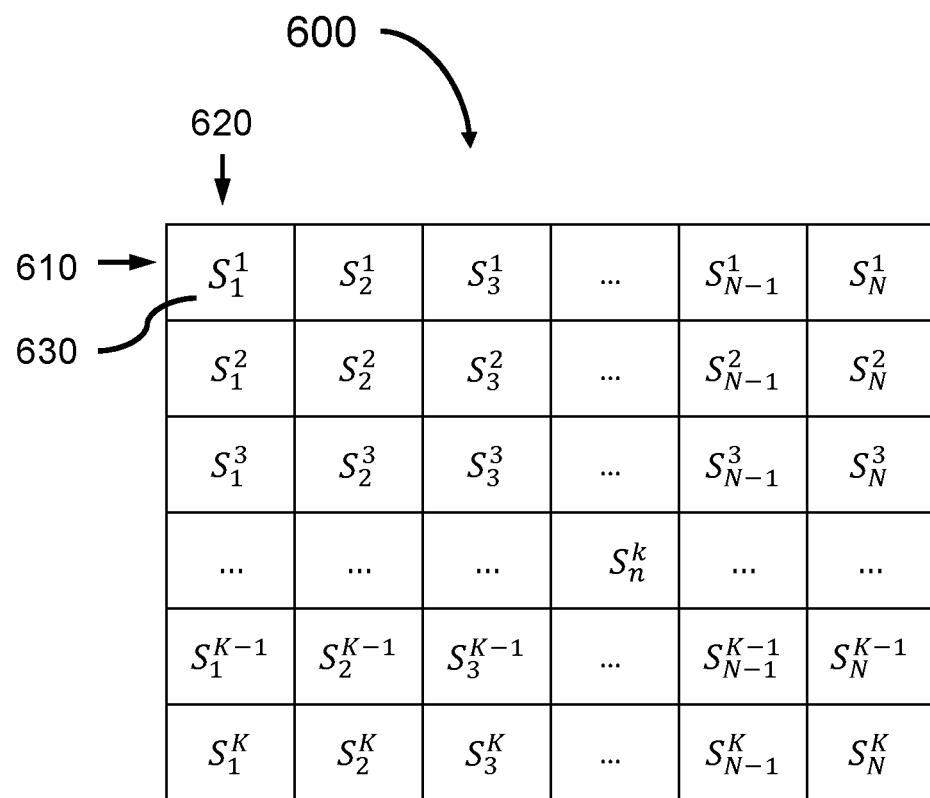
FIG. 6 is a diagram of an RFID communication protocol for a multi-antenna tag-reading process, in accordance with an embodiment of the present invention.

FIG. 6 is a diagram of an RFID communication protocol for a multi-antenna tag-reading process, in accordance with an embodiment of the present invention.

A response from a particular tag may not be decodable by the RFID reader 700 when other tag(s) also respond at the same time due to collision. Although, given enough time, a random access protocol may resolve collisions, a long resolution time is not desirable. Since a typical retail store may have a large population of tags near the CA 110 (e.g., other tags on the shelves or tags carried by other customers in the WA 210), the tags inside the CA may experience a high number of collisions, which can be due to multiple tags responding at the same time. This reduces the probability of decoding a particular tag in a given time slot and extends the time required to discover all the tags within the CA.

In various embodiments, the RFID reader 700 can instruct the transceivers 120, 125 to broadcast a query command and indicates the number of available slots; if a tag 410 can decode the query, it chooses a random slot and later responds with a 16-bit random sequence (called RN16) using FM0 modulation, which is a particular modulation scheme in the context of RFID generation 2 standard. in the selected slot; in each slot, if the reader can decode an RN16, it sends an acknowledgment (ACK) containing the same decoded RN16; and each tag decoding the ACK matches the included RN16 to the RN16 it chose earlier, and replies with its EPC when there is a match. A pair of TX/RX RF chains that share the same local oscillator can be employed for coherent detection.

Since each tag randomly chooses a slot to reply, a slot may have no RN16, only one RN16 or multiple RN16s that collide at the reader. In contrast, since it is unlikely for two tags to generate the same RN16, EPC responses do not usually collide. RN16s do not have built-in error detection, making it difficult for the reader to know whether an RN16 was decoded correctly or not. Leveraging the spatial diversity across antennas allows better decoding a valid RN16 even when collisions happen.

In various embodiments, transmission from an antenna comprises transmit frames (TF) where each TF contains several time slots for querying the tags. A block 600 of transmit frames having time slots 630, where slot i of TF k is denoted by $S_i^k$. Rows 610 show time slots for responses stimulated by a first transceiver, whereas columns 620 represent slots.

In a nonlimiting exemplary embodiment, during the first TF, a first antenna is the active transmitter and triggers responses from tags $x_1$ and $x_2$ in slot $S_3^1$, and in the second TF, second antenna is the active transmitter and triggers responses from the same tags in slot $S_4^2$. In time slot, $S_3^1$, the reader decodes two RN16s transmitted by $x_1$ and $x_2$ using the received signal at antenna $RX_2$ and $RX_4$, respectively.

In various embodiments, when the same antenna is used both as TX and RX, the tag with stronger received reply (say due to its proximity to the antenna) is always favored where the same set of stationary tags collide in the same time slot.

Figure 7:
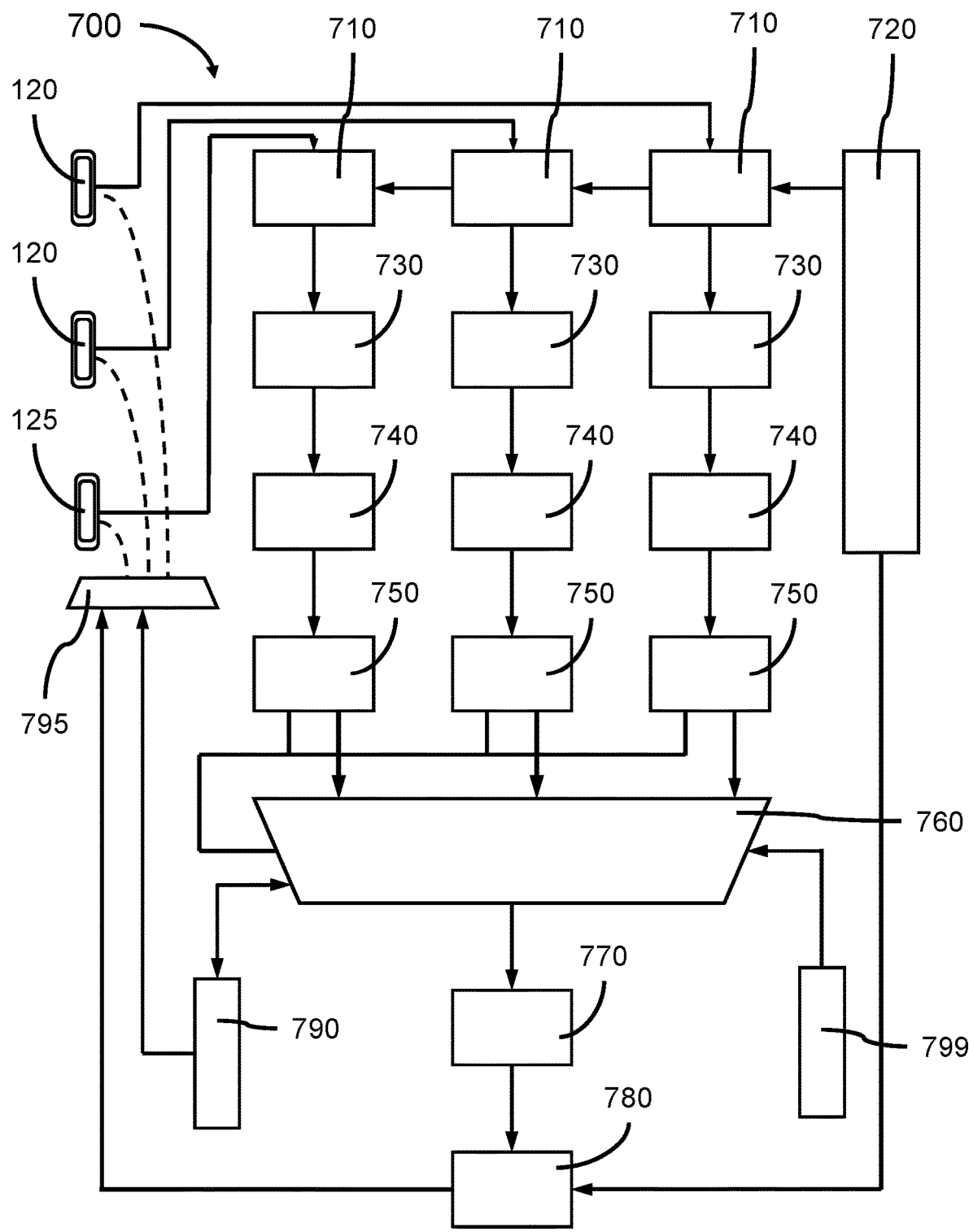
FIG. 7 is a block/flow diagram of an RFID reader for the point-of-sale checkout system utilizing radio-frequency identification (RFID), in accordance with an embodiment of the present invention.

FIG. 7 is a block/flow diagram of an RFID reader for the point-of-sale checkout system utilizing radio-frequency identification (RFID), in accordance with an embodiment of the present invention.

In various embodiments, a reader 700 can include a plurality of software defined radio (SDR) platforms 710 for wireless communications (e.g., USRP X310), a Clock Distribution Module 720 (e.g., octoclock) for a multi-channel system synchronized to a common timing source, a plurality of matched filters 730 for maximizing the signal-to-noise ratio (SNR), a plurality of gate blocks 740, a plurality of tagged decoders (TD) 750, a switch 760, a Reader block 770, an output X310 780, which is a software defined radio board, a Rasberry Pi 790, and a multiplexer 795.

Signals from each transceiver 120, 125 can be received by the X310 Each software defined radio (SDR) platform 710 can be equipped with either a UBX or TwinRX daughterboard that allows for communication within 902-928 MHz, an operating band of UHF RFID tags 410. The reader 700 can be in electronic communication with six antennas in the CA and four antennas in the WA for a total of ten antennas. Each antenna can separate the TX and RX signals with a circulator. Five TwinRX daughterboards can be used to enable ten RX RF chains, where each RF chain can be connected to one antenna. The output of the UBX can be connected to a set of multiplexers, which is controlled by a Raspberry Pi 790 to select the active TX antenna. A received I/Q sample can pass through a finite impulse response (FIR) matched filter 730 (MF) to mitigate the impact of noise. Then, the Gate block (G) 740 can perform pulse detection to do coarse frame synchronization. The frame can then be forwarded to the Tag Decoder block (TD) 750, which aligns symbols using preamble-based correlation and decodes the RN16 and EPC packets. The TD block can be extended to compute the Interference metric (IM) and estimate the received signal strength (RSS), where an interference metric can be based on a mean and a variance of a set of differences between two symbols in a bi-phase decoder after equalization. The TD blocks 750 can forward the decoded RN16s along with the IM to a central block called the Switch 760. The Switch block 760 implements the RN16 selection policies 799 and forwards the selected RN16 sequence to the reader block (R) 770, which generates the ACK based on the forwarded RN16. The selection policy 799 input into the switch 760 determines if any of the decoded RN16 signals are valid, and which RN16 should be picked to send an acknowledgement signal. The Reader block 770 can also be responsible for generating the Query packets broadcast to the tags. The Switch block 760 can also keep track of the current slot and Frame indices to update the transmitter in time. To do so, Switch block 760 can establish a UDP connection with an external Raspberry Pi 790 that operates as a micro-controller to activate specific ports of the multiplexers 795. Once the end of the TF is reached, the Switch 760 can encapsulate the next selected port within the UDP packet and send it over to the micro-controller.

Accurate localization may not be practical in retail settings due to the non-stationary environment. Combining observations, such as several RSSI and number of readings, from multiple antennas deployed in RFGo could yield a reliable estimation of the tag's position.

Antenna diversity for the TX path can utilize Time Division Multiple Access (TDMA), where it activates each antenna in turn to address illumination issues. Collisions occur during the RN16 phase where tags randomly choose the same time slot. By leveraging parallel decoding 2 of the received RN16 signal at multiple antennas and analyzing low-level signal metrics, our reader picks the RN16 with the highest probability of being correctly decoded. If a "poor" RN16 is ACKed in the absence of such an intelligent policy, the subsequent EPC response from the tag would not be decoded and the slot would be wasted.

Independent and synchronized RX RF chains collect I/Q samples in parallel, which are then used to retrieve RN16s.

In various embodiments, a Fixed Antenna Policy (FP) can rely on no meta information from the received signals. FP uses a fixed RX antenna, for example, $RX_j$ for all the slots in $TF_j$, to decode an RN16 and to generate and transmit the acknowledgement (ACK). A special case of FP, where RX and TX antennas are the same, can capture the behavior of traditional readers that are not equipped with simultaneous decoding capabilities. Note that, despite limitation of FP on RN16 selection, simultaneous decoding of EPC from multiple RX antennas can still happen in the reader 700. Simultaneous decoding not only increases the likelihood that a tag reply will be decoded through receive diversity, but it also provides multiple readings (or observations) for the tag (same EPC but different signal features) when it can be decoded from multiple antennas.

In various embodiments, a Majority Voting Policy (MVP) can use the knowledge of the set of decoded RN16s. MVP selects the RN16 that has the maximum number of detection events among all the ones decoded by the antennas. If two or more RN16s have been decoded equal number of times, MVP picks one at random. In various embodiments, each of the decoded RN16s from the plurality of antennas in a single tag reading session receive votes based on the number of antennas that decoded the decoded RN16s, and an antenna which corresponds to the decoded RN16 which has a maximum number of votes is selected.

In various embodiments, an Interference Metric Based Policy (IMP) can use the signal attributes for the set of decoded RN16s. In this policy, we compute a specially designed interference metric (IM), formally defined in Sec. 4.5, for each of the simultaneously received signals. IM provides a measure of interference in the received signal. Thereby, IMP selects the RN16 that has the minimum IM across all decoded RN16s, corresponding to the RN16 with highest decoding probability. Similar to MVP, IMP may also be randomized to select one RN16 among all RN16s for which their IM is below a threshold.

In resolving collisions when multiple tags reply at the same time slot, the decoder associated with only one of the RX antennas is capable of correctly decoding an RN16, then with very high probability, the decoded RN16 by different antennas are all different.

When multiple replies from different tags are colliding, there is a good chance that these two RN16's belong to two different tags and hence are different.

Interference metric (IM) can estimate a packet decoding rate (PDR) of an RN16 sequence in the absence of explicit error detecting mechanisms. IM estimates the fraction of interference and noise power in the received signal without explicit knowledge of the received signal, the interferers, or their powers. PDR is then calculated based on IM as described below. The lower the IM, the higher the probability of correct decoding.

Given that an RN16 is either correctly decoded or not in a give slot, its effectiveness may be quantified by: the accuracy of a binary classifier that compares this measure with a threshold in order to classify the received RN16 signals into two classes of "decodable" vs. "not decodable". The accuracy of a binary classifier is defined as the ratio of number of correct decisions over total number of decisions. Hence, as a quantitative representation of the true effectiveness of a measure, the effectiveness of a measure can be defined as the maximum accuracy that can be achieved for any threshold-based classifier which compares this measure with a threshold to define the outcome in one of two classes. In a threshold-based classifier, the classification is performed by calculating a metric for each item. The metric function outputs a real value number. This number is then compared with a threshold value (a real number) to determine if it is larger or smaller. The item is declared to belong to a class based on the comparison of the metric function value for each items and at least a threshold. There could be more than one threshold and hence multiple classes.

A simple measure is Received Signal Strength (RSS) which is readily available and can coarsely estimate PDR. Through a simulation involving 32 tags and a frame size of 16 slots, we see that RSSI has a low effectiveness of 0.69 which may be explained as follows. Since RSS merely represents the total received energy, it cannot distinguish between a decodable signal without interference vs. the superposition of multiple low power interferers since both cases yield a high RSS.

If prior knowledge of the signal and the interferers is available, more sophisticated measures such as signal to interference and noise ratio (SINR) may be used under Gaussian distribution. Indeed, SINR achieves an effectiveness of 0.97 in the same simulation since it directly captures the power of the useful signal relative to all interference and noise.

In various embodiments, the RFID reader 700 decodes a single RN16 packet with highest received power among all interfering RN16 signals by treating the interfering RN16s as noise. After equalization and passing the received samples through a matched filter, an estimation of the FM0-modulated RN16 symbols can be constructed, which is then used for decoding. A difference sequence can be determined by subtracting the even numbered symbols from the odd numbered ones, e.g., (1st symbol−2nd symbol) followed by (3rd symbol−$4^{th}$ symbol) and so on. IM is then the ratio of the standard deviation to the mean of the absolute value of the difference sequence while the RN16 bits can be retrieved by comparing the absolute value of the difference sequence with a threshold.

IM is a physical measure obtained in an intermediate step of the decoding and hence its computational complexity is negligible. The interference metric can be based on the mean and variance of a set of differences between two symbols in a bi-phase decoder after equalization.

To determine how such features should be combined, supervised learning can be employed by training a multi-layer neural network using the TensorFlow library in Python. Multiple tags can be positioned in the CA 110, as well as several tags outside the CA in arbitrary positions and orientations. Readings can be captured from the tags and each feature vector fed into the neural network by labeling the feature vector as either corresponding to an "inside" class or an "outside" class. The neural network (i.e., model) then computes and stores the optimal weights for each of its connections by minimizing the decision error as defined by a loss function. After training, the model applies the weights to an input feature vector and outputs the probability of a tag belonging to the "inside" class. This is achieved by using a Sigmoid activation function that outputs a value between 0 and 1. If the model outputs a value greater than 0.5 for a tag's feature vector, the particular tag can be considered as inside the CA. In various embodiments, the classifier can be trained with a multi-element feature vector for each tag including: the number of readings and average RSSI for each of the TX/RX antenna pairs inside the CA.

Figure 8:
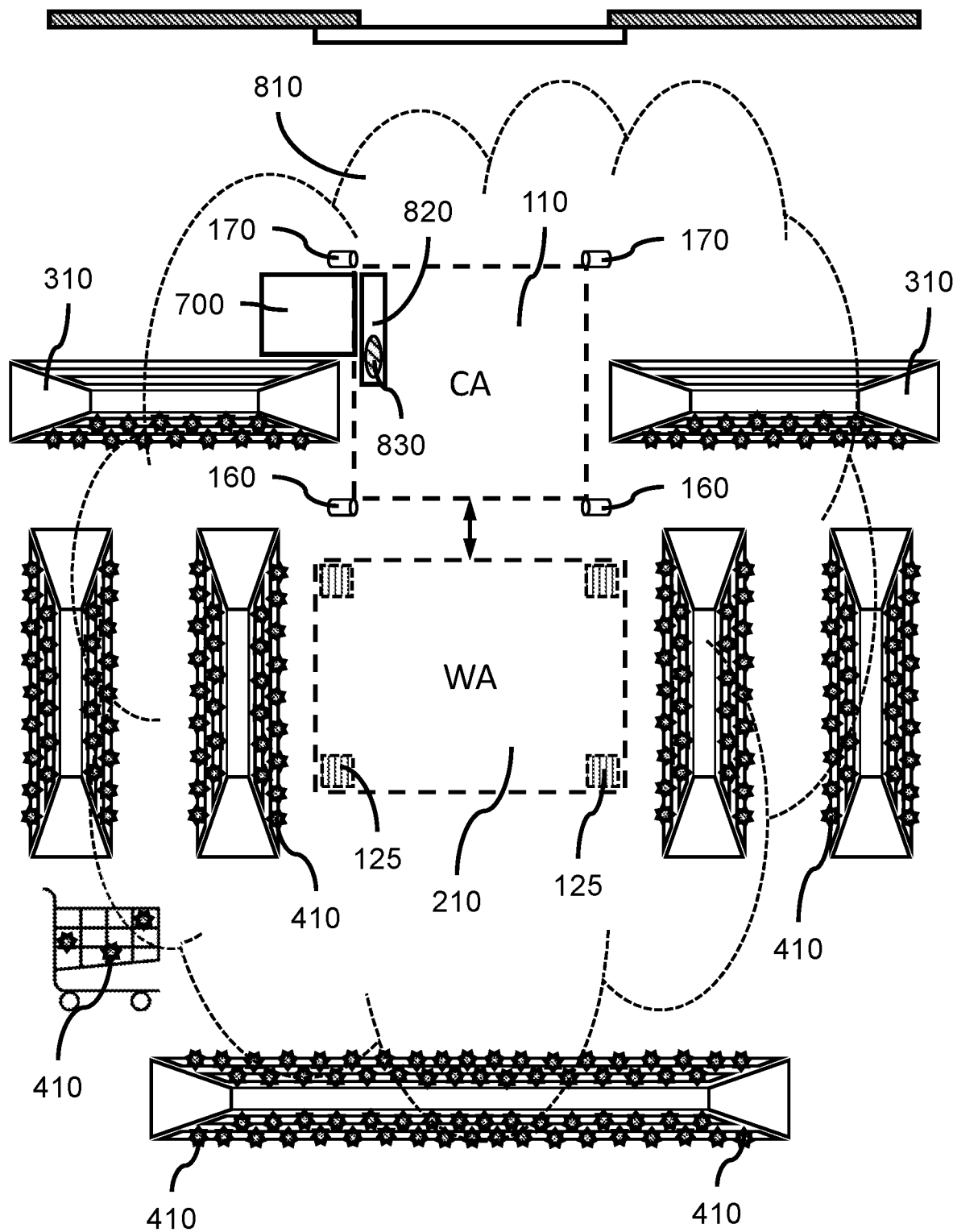
FIG. 8 is a top view illustrating a section of a store implementing a point-of-sale checkout system utilizing radio-frequency identification (RFID), in accordance with an embodiment of the present invention.

FIG. 8 is a top view illustrating a section of a store implementing a point-of-sale checkout system utilizing radio-frequency identification (RFID), in accordance with an embodiment of the present invention.

In various embodiments, customers can walk into the checkout area (CA) 110 from a defined "entrance," stay inside for a very brief time, and leave from the opposite side defined as the "exit." During the time the customer stays inside the CA 110, the checkout system 100 can utilize the custom-built RFID reader 700 to collect tag readings from several RFID antennas of the transceivers and use a neural network to classify the RFID tags as "inside" and "outside" the CA.

In various embodiments, items with RFID tags 410 may be stacked and/or displayed on shelves 310 in areas of the store adjacent to the checkout system 100, where the RFID tags may be activated and read by the transceivers of the checkout system 100. The antenna of the checkout system 100 may have an ill-defined range and coverage area 810 that overlaps with portions of a waiting area 210 and shopping area including the shelves 310.

In a non-limiting exemplary embodiment, when a customer enters the CA, a pair of infrared (IR) sensors 160 can detect the motion and trigger the start of new session at the reader 700, which starts collecting tag readings. Upon analyzing the readings, the neural network classifies them and displays the items detected in the CA on a billing terminal 820. The customer can then pay using a credit card reader or QR code scanner of payment processor of the billing terminal 820 and leaves the checkout lane. Another pair of IR sensors 170 can monitor the exit, enabling the system 100 to accept the next customer and start a new checkout session. Visual indicators 830 can guide the customer through the operation of each session, for example, a visual display screen, lights, sounds, verbal instructions, and combinations thereof.

The sequence of operations including the customer entry, scanning and output of the classification is collectively referred to as a checkout "session." In various embodiments, the checkout system 100 may complete the checkout process right at the checkout counter 820 and provide a final receipt to the customer before the customer exits the store. In various embodiments, the checkout system 100 may complete the checkout process after the customer exits the store, and provides a final receipt to the customer electronically. In various embodiments, the checkout system 100 may provide a tentative but not yet final charge at the checkout counter with the possibility of adjustment within a time period after the customer exits the store. In various embodiments, the checkout system 100 may provide a final receipt to the customer electronically some time up to the next opening of the store in the following day. Even though, the final adjustment to the customer card may have been made during a time period after customer checkout and the final bill has been provided to the customer, any undercharged or overcharged items may be adjusted during an inventory that is performed at night before the store opens for the following day. Such adjustment could be very useful in saving a customer a trip to the store to visit the customer service desk. The customer using such checkout process may have agreed to such scenarios, and may have allowed the adjustment to their original form of payment.

Figure 9:
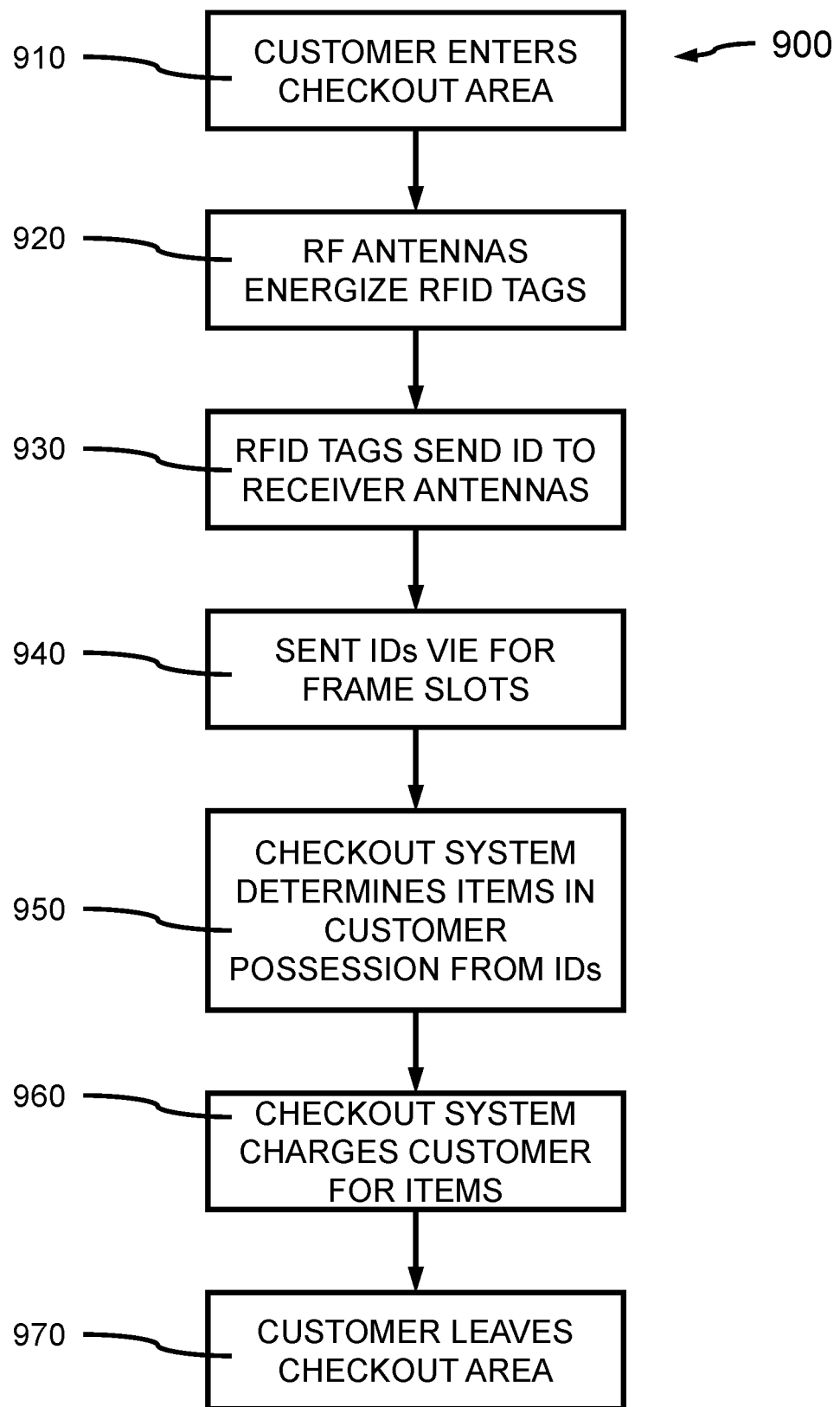
FIG. 9 is a block/flow diagram illustrating a checkout process for a point-of-sale checkout system utilizing radio-frequency identification (RFID), in accordance with an embodiment of the present invention.

FIG. 9 is a block/flow diagram illustrating a checkout process for a point-of-sale checkout system utilizing radio-frequency identification (RFID), in accordance with an embodiment of the present invention.

At block 910, a customer can enter a checkout area and be detected by the checkout system. The checkout system 100 can determine that the customer is remaining in the checkout system and wishes to purchase one or more items.

At block 920, the checkout system 100 can initiate reading RFID tags 410 associated with the one or more items by sending a signal from the antennas associated with one or more of transceivers 120, 125, where the signal broadcast by the transceiver(s) energize one or more RFID tags. The energized RFID tags can be in the checkout area or may be outside the checkout area.

At block 930, activated RFID tags send a coded response to the one or more transceivers, including an ID identifying the item being purchased.

At block 940, the coded response can contend for and be received in a particular time slot recognized by the RFID reader 700.

At block 950, the checkout system 100 determines which items are in the customer's possession and intended to be purchased from the received RFID responses and IDs. A classifier detects the items that a customer brings to the CA 110 and differentiates the customer items from items outside the CA.

At block 960, the customer is charged for the cost of the detected items, where the charge may be displayed to the customer or automatically billed to a credit or debit card on file with the store.

At block 970, an indicator signals to the customer that the transaction is complete, and the customer exits the CA. The sequence of operations including the customer entry, scanning and output of the classification can be collectively referred to as a checkout session 900.

In various embodiments, control sensors and visual indicators can guide the operation and sequence of each session.

In a nonlimiting exemplary embodiment, when a customer enters the checkout area (CA), a pair of infrared (IR) sensors can detect the motion and trigger the start of a new session at the custom-built reader, where the reader can start collecting RFID tag readings. Upon analyzing the readings, the neural network classifies them and displays the items detected in the CA on a billing terminal. The customer can then pay using a credit/debit card reader or QR code scanner, and leaves the checkout area. Another pair of IR sensors can detect the exit and reset the system/reader, enabling the system to accept the next customer and start a new checkout session. The IR sensors can also identify undesirable scenarios, i.e., customers invading the CA while busy or entering the CA prior departure of previous customer, and notify the system.

In various embodiments, a software classifier detects items that a customer brings to the CA 110. Since tags cannot be precisely localized in typical retail environments, a neural network model can be used to distinguish the tags inside the CA 110 from tags outside the CA by learning from the signal features exposed by the reader 700. The reader 700 can simultaneously decode the same EPC on all RX antennas (e.g, N RX antennas, where N is the number of antenna) for each TX antenna. After N TX antennas are activated, the reader can extract $N^2$ features for each tag from all TX/RX antenna pairs (transceivers). In addition to the rich feature vector, the dual-area antenna deployment helps us capture observations from both tags inside the CA and the ones in the WA, giving the NN model even more information to learn from.

In various embodiments, the items in a store, including the items a person brings to be checked out, can be divided into two subsets; the items the person is purchasing, and the items not being purchased. The checkout system, however, may not be able to differentiate between the two subsets in an entirely accurate manner. Therefore, the checkout system may accurately identify a plurality of items that the person is purchasing, but may also identify items that the person is not purchasing as being purchased. This can be classified as true positives and false positives. False positives can reduce customer satisfaction due to added costs on the amount charged for items not purchased, as well as reduced satisfaction due to the inconvenience of having to spend time correcting such mistaken identifications.

In addition, the checkout system may accurately identify a plurality of items that the person is not purchasing, but may also misidentify items being purchased as not being purchased. This can be classified as true negatives and false negatives. False negatives can increase vendor losses due to items leaving the store without being charged. This can result in lost profits and unaccounted for loss of inventory (i.e., shrinkage).

In various embodiments, a classifier can partition the set of objects into two subsets: R for retrieved items that represent the P (i.e., positive) class and NR for not retrieved items that represent N (i.e., negative) class. The intersection of P with R and NR can be divided into true positive (TP) and false negative (FN), respectively. The intersection of N with R and NR can be divided into false positive (FP) and true negative (TN) respectively.

A true positive (TP) is a classification of an item as being checked out by a customer when it is actually being checked out by a customer. A true negative is a classification of an item as not being checked out by a customer when it is actually not being checked out by a customer. A false positive is a classification of an item as being checked out by a customer when it is not being checked out by a customer. A false negative is a classification of an item as not being checked out by a customer when it is being checked out by a customer. Larger false positive values can reduce customer satisfaction. Larger false negative values can increase vendor losses.

In various embodiments, metrics can be defined to evaluate and illustrate the performance of the binary classification problem. The metric can include the True Positive Rate (TPR, also referred to as Sensitivity or Recall), defined as:

the ratio $r=|TP|/(|TP|+|FN|)$, where |TP| is the size of TP and |FN| is the size of FN. The False Negative Rate (FNR) is defined as:

$|FN|/(|TP|+|FN|)$, to measure how well the classifier can find the actual positive class.

The True Negative Rate (TNR, also called Specificity) is defined as:

$s=|TN|/(|TN|+|FP|)$, and its complement, i.e., $(|FP|/(|TN|+|FP|)$ is the False Positive Rate (FPR) to measure how well the classifier finds the negative class.

The Precision, also referred to as the Positive Predictive Value (PPV) is defined as:

$p=|TP|/(|TP|+|FP|)$, in order to measure how well the classifier can distinguish an item in the positive class. The complement of precision, i.e., $|FP|/(|TP|+|FP|)$, is called the False Discovery Rate (FDR).

As can be seen, the closer the value of the ratio(s) to 1, the fewer the number of false positives or negatives, and the more accurate the system is. The greater the and Precision, the greater the customer satisfaction. The lower the False Discovery Rate, the greater the customer satisfaction. The greater the Sensitivity and Specificity, the lower the losses and the greater the profits.

The Negative Predictive Value (NPV) is defined as:

$n=|TN|/(|TN|+|FN|)$, and its complement, $|FN|=(|TN|+|FN|)$, defines the False Omission Rate (FOR).

In various embodiments, when the performance of the classifier is of interest, the fact that the average metric will be available renders the definition of recall unusable even in the scenarios that the value function is simply the size of the set, i.e., all items have equal value. All items can be treated the same, while some items may have different worth or value, e.g., monetary value.

In various embodiments, the vendor loss (VL) and customer satisfaction (CS) can be defined for the classifier, as the mean of VL and CS taken over all possible realizations, which can be computed when the distribution of the items for such realization is known, where a realization refers to on outcome of a particular experiment.

The value of the items that wrongfully have not been positively counted (when the items belong to the positive set) as well as the value of the items that wrongfully have been positively counted (when the items belong to the negative set) can be determined.

In order to understand the physical meaning of VL and CS consider a scenario where the class P represents the set of items that a customer brings to the checkout station to purchase, and R is the set of items for which the customer is charged by the classifier, which retrieves the partition R in effort to find the class P. Partition R represents the set of items in R, where the classifier does not know the actual true class, P, that is the items that customer brings to the checkout area. The classifier however finds the set R and charges the customer for this set. The classifier is perfect if each time it finds a set R that is equal to set P, that is R=P.

The vendor loss is defined as the ratio of the item prices that have not been charged by the system to the total amount for which the customer is charged. Let f(A) represent the sum of the prices of the items in a set, A, where A can represent the set of items present in the store available for purchase. For example, where A is the set of all items for sale in the store, the checkout system identifies a subset, P (positives), of the set, A, that is expected to represent the items the customer has and will be charged for. f(A) can represent the sum of the prices of all the items in set, A.

$f(A)=\Sigma v_i$, where $v_i$ is the value of an item, $a_i \in A$, and $i$ is an index over all items in set $A$.

$VL=f(FN)/(f(TP)+f(FP))$, where f(FN) is the value of the items in the set of False Negatives (items taken from the store, but not identified by the classifier as included in set P), f(TP) is value of the items in the set of True Positives (items taken from the store and paid for), and f(FP) is value of the items in the set of False Positives (items charged to the customer, but not actually purchased). The functions, f, can be where f(FN) is counting the number of items that are in the set FN, or where f(FN) is the total worth of the items in set FN.

The vendor loss, VL, may also be defined as the ratio of the sum of item prices that have not been charged by the systems to the total amount that the customer has been charged after the adjustment for the items that were not in the customer cart but was charged to the customer by the system, as false positives. This implies that the customer has claimed an adjustment for mischarged items, or the system has recognized the error and adjusted it without customer interaction. In this case, the adjusted vendor loss (VL') is defined as:

$VL'=f(FN)/f(TP)$ because the price of the overcharged item, i.e., $f(FP)$ is adjusted and removed from the total customer payment.

The customer dissatisfaction (CDS) is defined as the ratio of the price of the items that have been charged to the customer without being in the customer's possession at checkout over the total amount for which the customer has been charged. Although this could be claimed by the customer and adjusted, but it could, nevertheless, makes the customer unhappy due to the mistake and associated inconvenience. The customer dissatisfaction may be reduced somewhat if the system automatically detects and adjusts the price in a later time, but before the customer recognizes and attempts to correct the mistake (e.g., before a credit card charge is received).

The CDS corresponds to:

$$CDS = \frac{f(FP)}{f(TP)+f(FP)} = \sum v_j / \left(\sum v_k + \sum v_j\right),$$

where j and k are indexes representing items in subsets j charged to the customer without being in the customer's possession at checkout, and k for items charged to the customer that were in the customer's possession at checkout, where $v_j$ and $v_k$ as the value (worth) of the item(s) $a_i$ and $a_k$, respectively.

In various embodiments, CDS is representative of the total value of the items that have been wrongly charged by the system over the total sale price (equivalently percentage of the overcharging a customer in terms of the price not the number of items).

In various embodiments, the customer satisfaction (CS) is defined as the ratio of the price of the items that existed in the customer cart and have been charged to the customer over the total amount for which the customer has been charged.

$$CS = \frac{f(TP)}{f(TP) + f(FP)},$$

which means that CS may be expressed based on CDS as CS=1−CDS. This means that if the total charge is the same as the value of the items in the customer cart, the customer is fully satisfied and CS=1.

If the customer is charged more than the value of the items in his cart, the customer satisfaction drops proportionally based on the value(s) of the mischarged items, and not just the number of mischarged items. A person mischarged for a few pounds of steak may be expected to be more upset than a person mischarged for a candy bar out of an entire cart of groceries. The same can be expected to be true for the definition of CS based on adjustment of the price of the items that the customer has not picked up and did not exist in his cart.

In various embodiments, the customer may still remain fully satisfied with this definition of CS even if there exist some extra items in the person's cart that were not charged for. These items can affect the vendor loss (VL) and appear as a loss to the vendor but would not be expected to affect the customer satisfaction based on CS or CDS.

It should be noted that VL, CDS, and CS are defined based on the value of the items not the number of items.

If an average value is used for all items, the calculations can revert back to Precision and Recall.

The definition of VL and CS metrics for a binary classification problem may be extended to the classifier. A classifier can be defined over a stochastic set of input of positive and negative sets. Instead of focusing on a particular realization of the classification problem and computing the VL and CS for that particular instance of the problem, all possible such outcomes and its probability distribution are considered to compute the expected value of VL and CS. The VL and CS for a classifier can be defined as an average value of these metrics over all possible realization of the classification problem and is denoted by $\overline{VL}$ and $\overline{CS}$, respectively. Even though this averaging may be defined as regular expected value of the VL and CS for each realization of the problem, it can be related as follows:

$$\overline{CDS}* = \frac{\mathbb{E}(f(FP))}{\mathbb{E}(f(TP \cup FP))}$$

$$\overline{VL}* = \frac{\mathbb{E}(f(FN))}{\mathbb{E}(f(TP \cup FN))}$$

$$\overline{CS}* = \frac{\mathbb{E}(f(TP))}{\mathbb{E}(f(TP \cup FP))}$$

The operator $\mathbb{E}$ means the expected value.

In various embodiments, the performance of the classifier is related to the combination of $\overline{CS}$ and $\overline{VL}$. Therefore, classifier design objective can be to maximize $\overline{CS}$ and minimize $\overline{VL}$. The $\overline{CS}*$ shows the average satisfaction of the customers in terms of the value function defined on the set of items, hence, it represents the fraction of the item values for which the customer is correctly charged (i.e., the items that indeed have been in the customer cart) to the value of the whole cart which could include the value of items that was not in the customer cart. This fraction would be between zero to 1 corresponding to complete dissatisfaction to true satisfaction.

The $\overline{VL}*$ is the average value of the items for which the customer have not been charged but indeed were in his cart to the whole sale value over large enough realization of the problem.

The objective function of such optimization problem can be defined for example as a linear combination of the vendor loss $\overline{VL}*$ and customer dissatisfaction $\overline{CDS}*$, where classifier can be designed to minimize both the vendor loss $\overline{VL}*$ and the customer dissatisfaction $\overline{CDS}*$.

In various embodiments, metadata and/or inventory tracking can be used to improve the checkout system and checkout efficiency. Other information that is available about the item can be used within the checkout process or even after the checkout process in the store is completed. Such information could be available through a tracking tag within the store before the customer begins the checkout process. Such tracking may also be realized through grouping the tags based on their proximity, for example, the items that are in the same shopping cart.

In various embodiments, time series analysis can be used, where, for example, if an item is seen before the checkout area within the inside of the store (e.g., in the WA) before the customer checks out, then within the checkout area during the checkout process, for a specific customer, and then after the checkout process in the store area between the checkout area and the store exit, then such transition can be used to assign the item to a particular customer.

Corrections to checkout can be accomplished, for example, by performing periodic inventory either dynamically during the operation time of the store or after the store closing. For example, if an item is assigned to a particular customer cart but later found in the store during the inventory, this item can be taken off of the customer charge and an adjustment can be made.

Multiple scenarios for keeping the information about an item by the vendor is also possible. First, a vendor would add the ID of all the tags for the items that are present in the store, which could be available for sale, in a database and keeps them active even after it is assigned to the customer at the checkout. An active state can mean that the RFID tag could be discovered at later time even if the store believes that it has been sold and is taken out by the customer. Hence, if it is later on found in the store, adjustment to the user cart can be made. Finding this item within the store could happen for example during a periodic inventory. Another possibility is that the item after the checkout process by the customer has left her bag, for example, the customer dropped an item, or has forgotten to take a bag with her outside the store.

In various embodiments, the vendor may mark an item to be inactive after a checkout process or after the final bill is sent. This means that such item would not be discovered by the store at later time and may not be adjusted. In an inventory mode, each tag responds with its unique ID called an Electronic Product Code (EPC).

In various embodiments, the vendor may consider an item to be active for an extended time after the final bill is sent. This extended time would help to yet another possibility of adjusting the bill at later time before customer attempts to physically go to the customer service for adjustment process. For example, consider a scenario that the final bill is sent to the customer within the time interval, say 15 minutes, after the customer exits the store. Even though, the final adjustment to the customer card has been made during a time period after the customer visit to the checkout counter and the final bill has been provided to the customer, any undercharged or overcharged items may be adjusted say during the inventory that is performed at night before the store opens for the following day. Such adjustment could be still very useful in saving a customer a trip to the store to visit the customer service desk.

There can also be a dedicated check-in process, where a customer who wish to reenter the store while carrying at least an item that belong to this store has to check in. The check-in process could use the same checkout process which means that the same system can be used for both a check-in and checkout process. To benefit from a full potential of this scenario, the tags should remain active at least till the final bill is sent to a customer. Such active period may also be extended for a time interval beyond the final bill. In either case, it is necessary to have a check-in process for a customer who wish to enter or reenter the store carrying a store item which is tagged.

In various embodiments, the checkout system can be configured to not charge a given customer for a specific item twice. This can be based on unique ID codes that individually identify an item, which the checkout system can recognize as purchased and previously charged for.

As employed herein, the term "hardware processor subsystem" or "hardware processor" can refer to a processor, memory, software or combinations thereof that cooperate to perform one or more specific tasks. In useful embodiments, the hardware processor subsystem can include one or more data processing elements (e.g., logic circuits, processing circuits, instruction execution devices, etc.). The one or more data processing elements can be included in a central processing unit, a graphics processing unit, and/or a separate processor- or computing element-based controller (e.g., logic gates, etc.). The hardware processor subsystem can include one or more on-board memories (e.g., caches, dedicated memory arrays, read only memory, etc.). In some embodiments, the hardware processor subsystem can include one or more memories that can be on or off board or that can be dedicated for use by the hardware processor subsystem (e.g., ROM, RAM, basic input/output system (BIOS), etc.).

In some embodiments, the hardware processor subsystem can include and execute one or more software elements. The one or more software elements can include an operating system and/or one or more applications and/or specific code to achieve a specified result.

In other embodiments, the hardware processor subsystem can include dedicated, specialized circuitry that performs one or more electronic processing functions to achieve a specified result. Such circuitry can include one or more application-specific integrated circuits (ASICs), field-programmable gate arrays (FPGAs), and/or programmable logic arrays (PLAs).

These and other variations of a hardware processor subsystem are also contemplated in accordance with embodiments of the present invention.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment. However, it is to be appreciated that features of one or more embodiments can be combined given the teachings of the present invention provided herein.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended for as many items listed.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A system for self-checkout at a point-of-sale, comprising:
   a plurality of radio frequency identification (RFID) transceivers within a store;
   an RFID reader configured to receive an RFID code from an RFID tag activated by the plurality of radio frequency identification (RFID) transceivers;
   a pair of RF-absorbing walls;
   entrance sensors at an entrance side of the pair of RF-absorbing walls configured to determine that a person has entered a checkout area;
   exit sensors at an exit side of the pair of RF-absorbing walls configured to determine that a person has exited the checkout area;
   a billing terminal with a payment processor configured to receive payment information from the customer in the checkout area; and
   a multilayer neural network classifier configured to determine whether the RFID tag is inside or outside the checkout area, wherein the multilayer neural network classifier is trained in a manner that a number of items incorrectly identified as being purchased is below a threshold to minimize customer dissatisfaction (CDS) determined as the ratio of the value of items charged to the customer but not purchased by a customer to the total charge to the customer, and wherein the multilayer neural network classifier minimizes a combination of a vendor loss (VL) determined as a ratio of the value of items that exit the store without being charged to the customer to the total amount of the value of the items taken from the store and paid for plus the value of the items charged to the customer, but not actually purchased, and the customer dissatisfaction (CDS).

2. The system as recited in claim 1, wherein the charge to the customer is adjusted after the customer has exited the store.

3. The system as recited in claim 2, wherein the adjustment to the charge is determined by a subsequent inventory of store items, and wherein vendor loss is given by: VL=f(FN)/(f(TP)+f(FP)), where f(FN) is the value of the items in the set of False Negatives for items taken from the store, but not identified by the classifier as included in set P, f(TP) is value of the items in the set of True Positives for items taken from the store and paid for, and f(FP) is value of the items in the set of False Positives for items charged to the customer, but not actually purchased.

4. The system as recited in claim 2, wherein the store checkout area (CA) is determined by the signal coverage of the plurality of radio frequency identification (RFID) transceivers and the pair of RF-absorbing walls separated by a distance.

5. The system as recited in claim 4, further comprising a waiting area (WA) adjoining the checkout area, where at least a subset of the plurality of radio frequency identification (RFID) transceivers are oriented to send signals to and receive signals from the waiting area (WA).

6. The system as recited in claim 5, wherein the RFID reader initiates a checkout process by sending an energizing signal from the plurality of radio frequency identification (RFID) transceivers.

7. A system for self-checkout at a point-of-sale, comprising:
  a pair of RF-absorbing walls separated by a distance;
  entrance sensors at an entrance side of the pair of RF-absorbing walls configured to determine that a person has entered a checkout area;
  exit sensors at an exit side of the pair of RF-absorbing walls configured to determine that a person has exited the checkout area;
  a billing terminal with a payment processor configured to receive payment information from the customer in the checkout area;
  a plurality of radio frequency identification (RFID) elevated transceivers within each of the pair of RF-absorbing walls;
  a plurality of floor-mounted transceivers in a floor below the pair of RF-absorbing walls, wherein the signal coverage of the plurality of radio frequency identification (RFID) transceivers determines a checkout area (CA);
  an RFID reader, wherein the RFID reader is configured to receive an RFID code from each of a plurality of RFID tags activated simultaneously by the plurality of radio frequency identification (RFID) transceivers, the RFID reader configured to receive each of the plurality of RFID codes in a separate time slot of a block of a transmit frame; and
  a classifier configured to determine whether the RFID tag is inside or outside a designated area, wherein the classifier is trained in a manner that a number of items incorrectly identified as being purchased is below a threshold to minimize customer dissatisfaction (CDS) determined as the ratio of the value of items charged to the customer but not purchased by a customer to the total charge to the customer.

8. The system as recited in claim 7, wherein the classifier is a neural network model that applies weights to an input feature vector and outputs a probability for each RFID tag being inside the designated area.

9. The system as recited in claim 8, further comprising a waiting area (WA) adjoining the checkout area, where at least a subset of the plurality of radio frequency identification (RFID) transceivers are oriented to send signals to and receive signals from the waiting area (WA).

10. The system as recited in claim 9, wherein the classifier minimizes a combination of a vendor loss (VL) determined as a ratio of the value of items that exit the store without being charged to the customer to the total amount of the value of the items taken from the store and paid for plus the value of the items charged to the customer, but not actually purchased, and the customer dissatisfaction (CDS), where a classifier algorithm partitions a set of objects into positive and negative subsets, wherein the set of objects includes all items detected by the system for self-checkout at the point-of-sale based on a comparison of a metric function value for each items and a threshold.

11. The system as recited in claim 10, wherein the charge to the customer is adjusted after the customer has exited the store.

12. A method for self-checkout at a point-of-sale, comprising:
  detecting that a person has entered a checkout area defined by a pair of RF-absorbing walls, entrance sensors at an entrance side of the pair of RF-absorbing walls configured to determine that a person has entered the checkout area, and exit sensors at an exit side of the pair of RF-absorbing walls configured to determine that a person has exited the checkout area, wherein activation of the entrance sensors trigger an energizing signal;
  determining whether an RFID tag is inside the checkout area (CA) using a multilayer neural network classifier and a plurality of radio frequency identification (RFID) transceivers, wherein the multilayer neural network classifier minimizes a combination of a vendor loss (VL) determined as a ratio of the value of items that exit the store without being charged to the customer to the total amount of the value of the items taken from the store and paid for plus the value of the items charged to the customer, but not actually purchased, and the customer dissatisfaction (CDS) determined as the ratio of the value of items charged to the customer but not purchased by a customer to the total charge to the customer, where a classifier algorithm partitions a set of objects into positive and negative subsets, wherein the set of objects includes all items detected by the system for self-checkout at the point-of-sale based on a comparison of a metric function value for each items and a threshold; and
  charging the person an amount for items associated with the RFID tag determined to be inside the checkout area.

13. The method as recited in claim 12, further comprising determining that the person has exited a checkout area.

14. The method as recited in claim 13, wherein the person is charged for the items associated with the plurality of RFID tags after the person has left the checkout area.

15. The method as recited in claim 14, wherein the charge to the customer is adjusted after the customer has exited the store.

16. The method of claim 15, wherein the adjustment to the charge is determined by a subsequent inventory of store items.

\* \* \* \* \*